United States Patent
Kefferpuetz et al.

(10) Patent No.: US 9,726,462 B2
(45) Date of Patent: Aug. 8, 2017

(54) METHOD AND DEVICE FOR LOCAL STABILIZATION OF A RADIATION SPOT ON A REMOTE TARGET OBJECT

(71) Applicant: MBDA Deutschland GmbH, Schrobenhausen (DE)

(72) Inventors: Klaus Kefferpuetz, Scheyern (DE); Carolyn Kalender, Sulzemoos (DE); Juergen Zoz, Friedberg (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 0 days.

(21) Appl. No.: 14/975,271

(22) Filed: Dec. 18, 2015

(65) Prior Publication Data

US 2016/0178332 A1 Jun. 23, 2016

(30) Foreign Application Priority Data

Dec. 19, 2014 (DE) .................. 10 2014 018 802
Aug. 8, 2015 (DE) .................. 10 2015 010 276

(51) Int. Cl.
*F41H 13/00* (2006.01)
*G02B 26/06* (2006.01)
*H01S 3/00* (2006.01)

(52) U.S. Cl.
CPC ........ *F41H 13/0062* (2013.01); *H01S 3/0007* (2013.01)

(58) Field of Classification Search
CPC ... F41H 13/0062; F41H 13/005; G02B 26/06; G02B 23/12
USPC ........ 250/201.9, 208.1, 203.2, 206, 214 AL, 250/221, 491.1; 356/614, 141.2, 141.5, 356/512

See application file for complete search history.

(56) References Cited

U.S. PATENT DOCUMENTS

| | | | | |
|---|---|---|---|---|
| 3,696,248 A | * | 10/1972 | Cunningham | .......... F41G 3/145 250/203.2 |
| 5,918,305 A | * | 6/1999 | Livingston | .............. G01S 17/66 89/1.11 |
| 6,723,974 B1 | * | 4/2004 | Sepp | ................... F41H 13/0056 250/201.9 |

(Continued)

OTHER PUBLICATIONS

European Search Report issued in European counterpart application No. EP 15 00 3426 dated Apr. 18, 2016, with Statement of Relevancy (Three (3) pages).

(Continued)

*Primary Examiner* — David A Vanore
(74) *Attorney, Agent, or Firm* — Crowell & Moring LLP

(57) ABSTRACT

A method for local stabilization of a radiation spot formed by a high energy laser beam includes receiving radiation reflected by the target object, where the radiation reflected by the target object passes through the same optical path as the high energy laser beam. An image processing is performed by analyzing and comparing the image of the illuminated target object or part of the illuminated target object to at least one image of the illuminated target object or part of the illuminated target object produced at a prior point in time. A correction signal is computed, with which an optical correction device is actuated. A filter correction signal is produced by a filter device, while a controller correction signal is produced by a fine tracking controller. Finally, the correction signal is formed from the filter correction signal and the controller correction signal.

14 Claims, 2 Drawing Sheets

(56) References Cited

U.S. PATENT DOCUMENTS

| | | | | |
|---|---|---|---|---|
| 7,405,834 B1* | 7/2008 | Marron | ............... | F41H 13/0062 356/450 |
| 8,022,343 B2* | 9/2011 | Solenne | ................. | F41G 7/303 244/3.1 |
| 8,023,536 B1* | 9/2011 | Billman | ............... | F41H 13/005 372/108 |
| 8,227,735 B1* | 7/2012 | Marron | ............... | G03H 1/0443 250/208.1 |
| 8,537,371 B2* | 9/2013 | Steffensen | ............. | G01S 17/66 356/614 |
| 8,853,604 B1* | 10/2014 | Barchers | .............. | G01S 7/4814 250/201.9 |
| 2009/0097508 A1 | 4/2009 | Protz et al. | | |
| 2010/0282942 A1* | 11/2010 | Mosier | ................. | F41H 13/005 250/203.2 |
| 2011/0103410 A1* | 5/2011 | Hutchin | ............. | F41H 13/0062 372/9 |
| 2012/0292481 A1* | 11/2012 | Hutchin | ............. | F41H 13/0062 250/201.9 |
| 2015/0049329 A1* | 2/2015 | Bridges | ................ | G01B 21/047 356/51 |
| 2015/0069216 A1* | 3/2015 | Hutchin | ................ | G01J 1/4257 250/201.9 |
| 2016/0178332 A1* | 6/2016 | Kefferpuetz | ........ | F41H 13/0062 250/491.1 |
| 2016/0202356 A1* | 7/2016 | Geidek | ................... | G01S 17/66 356/614 |

OTHER PUBLICATIONS

Fitzpatrick et al.: "Bayesian statistical approaches to tracking through turbulence", American Control Conference, 2004. Proceedings of the 2004 Boston, MA, USA, Jun. 30-Jul. 2, 2004, Piscataway, NJ, USA, IEEE, Jun. 30, 2004, pp. 1499-1503, XP031989674, ISBN: 978-0-7803-8335-7.

* cited by examiner

METHOD AND DEVICE FOR LOCAL STABILIZATION OF A RADIATION SPOT ON A REMOTE TARGET OBJECT

CROSS REFERENCE TO RELATED APPLICATIONS

This application claims priority under 35 U.S.C. §119 from German Patent Application No. 10 2014 018 802.7, filed Dec. 19, 2014, and 10 2015 010 276.1, filed Aug. 8, 2015, the entire disclosures of which are herein expressly incorporated by reference.

TECHNICAL FIELD

The present invention relates to a method for local stabilization of a radiation spot on a remote target object. It furthermore relates to a device for local stabilization of a radiation spot on a remote target object in accordance with such a method. A high energy laser beam is emitted by a high energy radiation emitter and aimed at the target object that is remotely situated or moving at great distance and on which it produces the radiation spot. The goal is to destroy or damage the target object by means of the high energy laser beam.

BACKGROUND OF THE INVENTION

The propagation of high energy laser beams in the atmosphere is subject to turbulent disturbances that are caused by temperature fluctuations, and thus minor fluctuations in the refractive index of the air, and vary with time. These disturbances result in a local deflection of the high energy laser beam (the so-called tip/tilt portion) and an additional non-linear change in the beam profile. The effect of the high energy laser beam on the target deteriorates if the radiation spot does not constantly remain at the same location on the target object (even if the latter moves) but instead moves around on the target object. If the power of the high energy laser (HEL) is to be maximized on the target object, it is necessary to be familiar with and compensate for the turbulent disturbances. To this end, the target must initially be observed, for which purpose normally an image acquisition device is provided that detects light emitted or reflected by the target object.

In the case of extended targets, the following effects lead to an impairment in the target object image recorded by the image acquisition and thus to potential worsening of the stabilization of the radiation spot on the target object:
  Non-homogeneous temporal variation in the surface brightness of the target object observed by the image acquisition device, e.g. moving glints, non-homogeneous illumination, shadows, effects of turbulence, etc.;
  When the target is illuminated with an illuminating laser, additional speckle effects and non-homogeneities in the surface brightness may occur;
  Heavy blurring of the target contours, e.g. by turbulences, non-homogeneous target illumination conditions, and speckle effects.

Moreover, the turbulence in the air that the high energy laser beam passes through on its way to the target is subject to local fluctuations; for the observability of the turbulence it is therefore necessary to detect these fluctuations within limited areas around the high energy laser beam. Typically the Fried parameter $r_0$ or the isoplanatic angle $\Theta_0$ is used for evaluating the locally suitable areas. They describe local or angular areas outside of which a significantly changed turbulence may be assumed.

Conventional ideas for detecting turbulence are known—for instance, using guidestars in astronomy or tip-tilt laser spots in connection with high energy lasers when detecting the tip-tilt portion. So-called adaptive optics are used for detecting higher modes of turbulence. These devices for detecting turbulence in accordance with these known methods each require additional sensors and/or transmitters.

In the field of image processing, widely used methods are measuring the center of gravity of the image of the target object in the image acquired by the image acquisition device or alternatively evaluating a four quadrant detector.

The drawback of this is that the temporal variations in the surface brightness are interpreted as a virtual turbulent tip-tilt movement and produce additional noise that has a significantly detrimental effect on the stabilization of the radiation spot on the target object. Image blurs also lead to additional noise.

Alternative methods, for instance correlation methods, are also sensitive to strong fluctuations in surface brightness. Contour tracking methods are less sensitive to target surface fluctuations in brightness, but produce significant additional noise in the image acquired by the image acquisition device with contour blurs of the target. Statistical methods published in the literature attempt to estimate turbulent image degradation, but do not solve the problem of temporal variation in surface brightness.

With respect to control, efforts are common in which input data for a filter that is switched in series with the controller are the result of the image processing, that is, that the estimated variables of the filter form the input for the control device. This approach is pursued especially when the image processing result is noisy, for instance when using a gradient-based image processing method. It is a drawback of this approach that the filter also eliminates higher-frequency noise components that also result from the effects of turbulence, especially for moving targets.

SUMMARY OF THE INVENTION

An object of the present invention is therefore to provide a method and a device for stabilization of a radiation spot on a remote target object so that rapid destruction of the target object by means of high energy laser beams is made possible.

This inventive method for local stabilization of a radiation spot on a remote target object, in which the radiation spot is formed by a high energy laser beam that is aimed at the target object by a high energy radiation emitter, and in which the target object is illuminated by an illumination beam that is aimed at the target object by an illumination device, is distinguished in that radiation reflected by the target object that is illuminated by the illumination beam is received by an image acquisition device, in that the radiation reflected by the target object to the image acquisition device passes through the same optical path as the high energy laser beam, in that the image of the illuminated target object or of a part of the target object produced by the image acquisition device is analyzed and compared to at least one image of the illuminated target object or of a part of the target object acquired at a prior point in time or to an image stored in an object database, and in that proceeding from this comparison a correction signal is determined with which an optical correction device arranged in the optical path passed through by both the high energy laser beam and the reflected radiation is actuated. The result of the comparison performed in the image processing device is then supplied to a filter device and parallel thereto to a fine tracking controller.

Then a filter correction signal is produced by the filter device and a controller correction signal is produced by the fine tracking controller. Then the correction signal is formed from the filter correction signal and the controller correction signal.

The controller device is formed by a fine-tracking controller and a filter. Controller and filter thus each calculate a correction signal that is summed and used for actuating the correction device.

When using a movement model for the radiation spot (high energy laser spot) on the target object and the results from the image processing (for instance, warping parameters, displacement of the radiation spot from hold point, time stamp), the filter predicts the displacement of the radiation spot from the hold point in the next time interval and calculates a correction signal (filer correction signal $K_F$). In this manner it is possible to compensate low-frequency noise components from the filter itself and to minimize contouring errors. The movement taken into account in the movement model is made up of portions of a target movement and effects of turbulence.

In addition to information from the image processing, measurements of a radar and/or the rough tracking image processing in the filter may also be taken into account as additional measurements.

The fine tracking controller also uses the results of the image processing (for instance, warping parameters, displacement of the radiation spot from the hold point, time stamp) to compensate the remaining residual errors (higher frequency noise components, deviation of true radiation spot movement from the movement model in the filter). The controller is called up in the same cycle as the image processing is called up. It may be advantageous for the filter if it is called up more frequently.

The image stored in an object database may also be a synthetic image or an image reduced to certain image elements (for instance, to edges). The comparison of the acquired image to an image stored in an object database may be advantageous in particular when there is no available image acquired at a past point in time or this previously acquired image is not suitable for a comparison. It may also make sense to compare a plurality of different images of different objects stored in the object database to the acquired image in order to initially identify the target object in this manner.

Since the light returning from the target object to the image acquisition device experiences the same turbulent atmosphere as the high energy laser beam (at least in the vicinity of the Fried parameter $r_0$), the image produced on the image acquisition device using the light returning from the target object to the high energy radiation emitter may be used as an indicator for the disturbances of the radiation spot on the target object produced by the high energy laser beam that are caused by the turbulence. Thus, in the vicinity of the high energy laser spot (that is, the radiation spot), the image of the target object on the image acquisition device experiences turbulent disturbances similar to those the radiation spot experiences. The inventive method consequently permits a turbulence estimate without having to perform a complicated technical wavefront measurement.

The turbulence estimate and the at least partial compensation of the turbulence effects on the high energy laser beam and the radiation spot formed thereby it on the target object that is performed thereafter are made on the basis of the images of the target object consecutively recorded by the image acquisition device, preferably high speed camera images. The differences that result from different wavelengths of the high energy laser beam and the returning light are not significant here.

Good robustness relative to changes in the surface intensities on the target object and against distortion of the shape of the target object due to the effects of turbulence may be attained using the iterative image processing method (for instance warping method). Thus although the drawbacks of classic image processing methods are avoided, this occurs at the price of a certain computing time that is noticeable as dead time in a control loop and may result in contouring errors. This drawback is avoided using a pre-control via the filter device. At the same time, higher frequency noise components may be retained in the determined displacements so that the fine tracking controller may react to them. This is essential for turbulence compensation.

By adapting the fine tracking controller to the current dead time it is possible to attain a further improvement in the noise suppression. When the warping method is used, the dead time may fluctuate, e.g. due to different template variables. In one preferred embodiment of the method, the current dead time is calculated in the controller on the basis of time stamps transmitted to the image processing device and the controller parameters are adapted to this dead time online.

In another advantageous refinement of the inventive method, due to the filter results from the filter device being returned to the image processing device, the robustness thereof is increased and the number of iterations, and therefore the dead time, is minimized.

Moreover, the filter even permits a target point that is temporarily not visible due to masking to continue to be tracked and permits immediate return after the masking phase has ended.

The core idea of the invention is thus to use the temporal change of the image of the target object illuminated by the illumination beam, or of part of the target object that is situated as much as possible at the same location on the target object at which the high energy laser beam spot is situated, or at least in its immediate vicinity, on the image acquisition device as a measurement variable or indicator for the change in the actual high energy laser beam spot formed on target object and to undertake a real time correction of the optical errors using the inventive control.

Thus, by using the inventive method there is an increase in the effective power at the site of the radiation spot on the target object using compensation of the effects of turbulence without there being a requirement for a major technical complexity.

The calculation of the image processing requires a certain time, which is why it is only performed every 5 ms (5-millisecond intervals). This leads to the controller "running behind" the target point or the target (so-called contouring error). In the interim, the filter itself makes predictions and may, for instance, be called up every 1 ms (1-millisecond intervals). Filtering is thus performed much more often (for instance 5 times more frequently) as controlling). Lower frequency noise components may be compensated in this manner.

In each time interval, for actuating the optical correction device a correction signal, for instance in the form of an electrical voltage signal ($u_x$, $u_y$), is produced for each axis (x, y) of the optical correction device that may be pivoted about two axes. The correction signal is formed as the sum of the corresponding correction signal at a previous point in time (t−1) and a differential correction signal ($\Delta u_{x\ Filter}$, $\Delta u_{y\ Filter}$) determined by the filter. The controller forms a separate differential correction signal ($\Delta u_{x\ Controller}$, $\Delta u_{y\ Controller}$). Therefore, the following applies for voltage signals:

$$u_x = u_{x(t-1)} + \Delta u_{x\ Filter} + \Delta u_{x\ Controller}$$

$$u_y = u_{y(t-1)} + \Delta u_{y\ Filter} + \Delta u_{y\ Controller}$$

This summing is performed at every time interval. Since the filter is called up more frequently than the controller, this summation (and the relaying of the correction signal to the optical correction device) occurs in the filter cycle, for instance every 1 ms for the filter and every 5 ms for the controller.

If no calculation of the controller is performed because there was no new image comparison result, the value zero is used for the $\Delta u_{controller}$.

$$\Delta u_{x\ Controller}=0$$

$$\Delta u_{y\ Controller}=0.$$

For conducting the image comparison, each image is provided with a time stamp that makes it possible to order the acquired images chronologically and thus to assign the appropriate time stamp to each measurement so that it is certain to which point in time of the image recording the results of the image processing apply. The image age is forwarded via the image processing when the image is imported. Thus it is possible to determine the image index to which the image processing result belongs.

An inventive device for local stabilization of a radiation spot on a remote target object in accordance with the inventive method is distinguished by an illumination device for emitting an illumination beam onto a target object a high energy laser for emitting a high energy laser beam onto the target object, an optical correction device that is provided in the optical path of the high energy laser beam and that may be actuated by a control device, a radiation decoupling device that is provided in the optical path of the high energy laser beam and that is embodied for decoupling radiation that is from this optical path and that is received as a reflection of the illumination beam and to guide said radiation onto an image acquisition device, and an image processing device that is connected to the image acquisition device for transmitting an image signal therefrom and that is provided with a control device that is designed for producing a correction signal and that, for transmitting the correction signal, is connected to a control device for the optical correction device. Said optical correction device includes a parallel circuit from the fine tracking controller and a filter device that deliver portions of the correction signal for the optical correction device.

This device makes it possible, to estimate and compensate, in advance, the future turbulence effects on the high energy laser beam without major technical complexity such as would be necessary, for instance, when using a wavefront sensor.

Overall the advantage of maximizing the laser energy in the radiation spot formed on the target object is obtained, and thus a clear reduction in the radiation time, without using a wavefront sensor or guidestar, is also obtained Preferred exemplary embodiments of the invention with additional details and further advantages are described and explained in greater detail in the following, referencing the enclosed drawings.

DETAILED DESCRIPTION OF THE EXEMPLARY EMBODIMENTS

Figure 1:
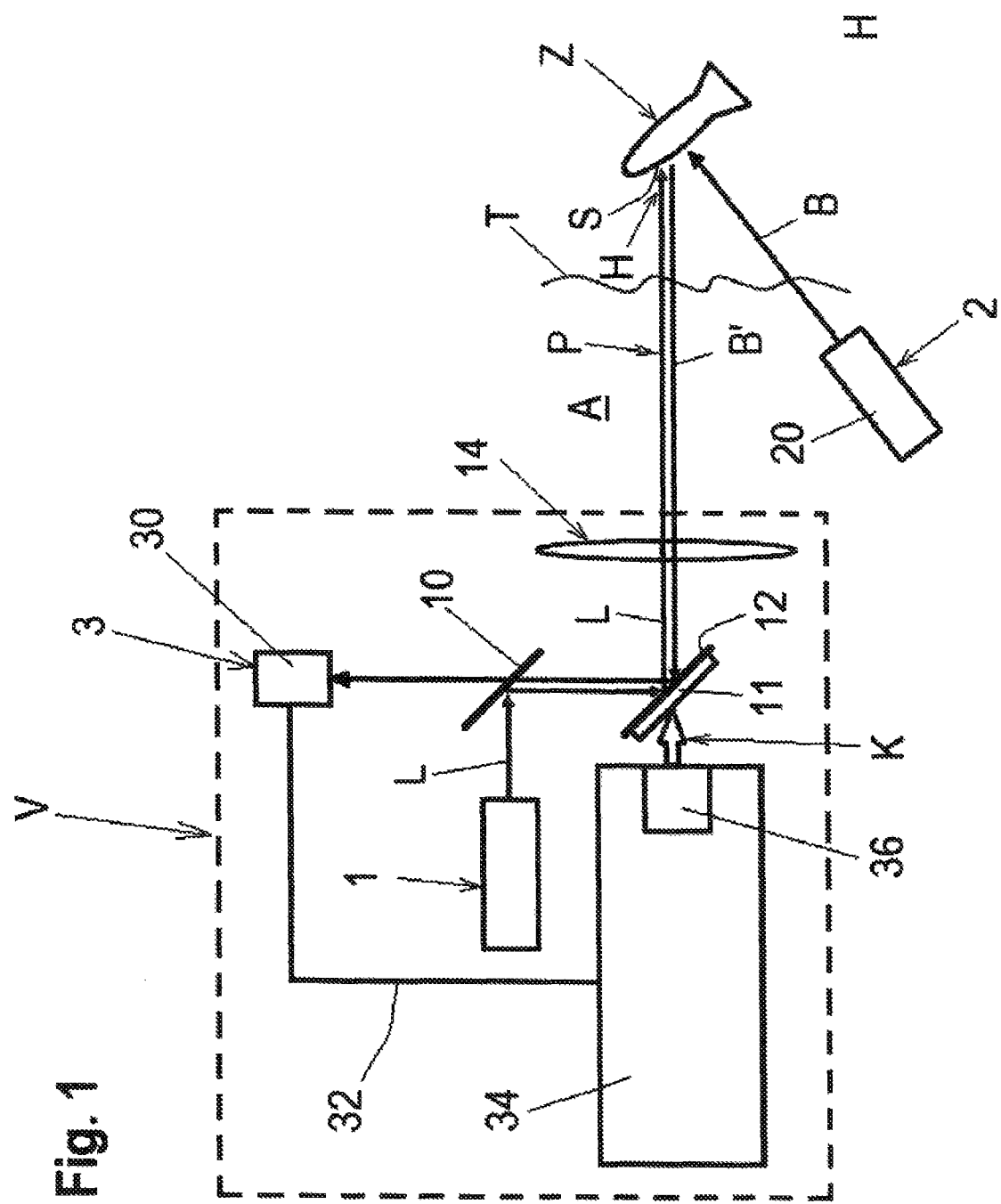
FIG. 1 is a schematic structure of an inventive device for local stabilization of a radiation spot on a remote target object; and, FIG. 2 is a block diagram of a fine tracking control circuit.

FIG. 1 schematically depicts an inventive device for local stabilization of a radiation spot on a remote target object.

This device has a high energy radiation emitter 1 that emits a high energy laser beam L. This high energy laser beam L strikes the first tilted mirror 10 and from there is relayed to a second tilted mirror 12. The first tilted mirror 10 is embodied as a dichroic mirror in order to decouple the high energy laser beam from an image received on the same optical path. The second mirror 12 is a tip/tilt mirror, the angle of which is variable and commanded by a control device.

The high energy laser beam L reflected on the second tilted mirror then passes through a focusing device 14 embodied, for instance, as a telescope, and strikes the outer skin of the very remotely situated and/or moving target object Z, which in the illustrated example is formed by an aircraft. In this manner the high energy laser beam L produces a radiation spot S on the outer skin of the target object Z. Using the effect of the high energy laser beam L, the outer skin of the target object Z is heated at this radiation spot S such that the structure at this location is weakened and the target object Z is destroyed or damaged thereby. One typical use is the engagement of aircraft weapons.

On its path from the device V to the target object Z, the high energy laser beam L passes through the atmosphere A, in which turbulences T occur; the latter are represented schematically in FIG. 1 as a wavy line. The effect of such turbulences is that the radiation spot S on the target object Z is not location-fast, but instead deviates slightly with respect to the hold point H, sighted by a target device, on the target object Z. The result is that the radiation energy applied locally to the outer skin of the target object Z does not remain constant during the irradiation, so that the effect of the irradiation is sub-optimal. The temperature required on the outer skin of the target object Z to soften or melt the outer skin is therefore only attained after a longer irradiation period and/or only when using greater radiation energy. To attain this goal even with lower radiation energy and a shorter irradiation period, the radiation spot S on the outer skin of the target object Z must be stabilized locally. In addition to the conventional methods for target tracking that follow the radiation spot S extremely precisely, even for a moving target object Z, the problem of target point displacement of the high energy laser beam L due to turbulences must be solved.

To this end, the target object Z is illuminated from essentially just as great a distance as the distance between the device V and the target object Z by means of an illumination device 2 that is formed, for instance, by an illumination laser 20. The illumination beam B emitted by the illumination laser 20 normally has a wavelength that deviates from the high energy laser beam L. The illumination laser 20 is divergent and illuminates the entire target object or at least extensive areas of the target object Z.

The illumination beam B also travels a great distance from the illumination device 2 to the target Z and strikes the target object Z, specifically also on the outer skin at least in the area of the radiation spot S. From there the illumination beam B' reflected on the outer skin of the target object Z is guided on the same optical path P to the device V that the high energy laser beam L takes from the device V to the target Z. This means that the reflected illumination beam B' also passes through the atmosphere A and its turbulences T and therefore experiences the same optical deviations as the high energy laser beam L passing through the turbulences T at the same point in time.

The reflected illumination beam B' coming from the target object Z passes through the focusing device 14 and strikes the second tilted mirror 12, which deflects it towards the first tilted mirror 10.

This first tilted mirror 10 is permeable for the wavelength of the illumination beam B so that it forms a radiation decoupling device that does not deflect the illumination beam B' reflected by the target object Z, but instead lets it pass through. The reflected illumination beam B' passing through the first tilted mirror 10 then strikes an image acquisition device 3 that is formed, for instance, by a high speed camera 30. The image acquisition device 3 acquires an image of an area of the target object Z or even the entire target object Z.

The image signal obtained in the image acquisition device 3 is guided via a signal line 32 to an image processing device 34 that analyzes the image represented by the image signal and compares it to an image produced previously. This previously produced image may be an image acquired at a prior or earlier point in time or it may be a synthetically produced image. From a series of such comparisons of images produced successively or images acquired by the image acquisition device 3 of the area illuminated by the illumination beam B on the outer skin of the target object Z, which area is perceived via the reflected radiation illumination radiation B', the image processing device 34 can provide a prediction about which optical influences the high energy laser beam L being radiated at this point in time is subjected to on its path through the atmosphere A. The image processing device determines from this prediction a correction signal that is sent by a control device 36, which is provided in the image processing device 34 or is connected thereto—symbolized by the open arrow K—as a control signal to a control device for the second tilted mirror 12 embodied as a tip/tilt mirror.

Naturally, with minor concessions to accuracy, it is also possible to determine the correction signal directly from a comparison of the image signals of the most recently received images of the illumination point without a prediction being provided and then being used as the foundation for the correction.

The second tilted mirror 12 thus forms an optical correction device and compensates the optical effects that are expected on the path between the device V and the target object Z that are caused essentially by the turbulences T. In this manner a fine tracking circuit is formed that compensates the damaging effects of the turbulences T on the high energy laser beam L (and naturally also on the reflected illumination beam B') so that the radiation spot S formed by the laser beam L on the outer skin of the target object Z remains nearly locationally constant.

In the device depicted in FIG. 1, light returned from the target is received and evaluated in a high speed camera in the same optical canal or on the same optical path that the high energy laser passes through. On the basis of this a correction of the high energy laser beam is made using, for instance, a tip/tilt mirror embodied as a piezo mirror as the optical correction device. Although the target object in the illustrated example is illuminated by means of an illumination laser, other forms of illumination may also be used, including for evaluating the back reflection due to solar irradiation.

The core point of the described inventive method, illustrated as an example, is the comparison of a so-called template image of an object (the target object or part of the target object) with the image currently being acquired by the image acquisition device 2 (called the fine tracking image in the following). The goal is to determine the parameters of a transformation that reproduces the template image optimally, in the context of a certain quality, on the current fine tracking image. The minimum quadratic error amount of the pixel deviations may be used for this, for instance. At this point it is also possible to weight the influence of certain parameters of the transformation in the error amount differently or to give more or less weight to certain pixel deviations. In addition, a hierarchical optimization in which the components of a transformation (e.g. rotation, translation) are successively optimized is also possible. The transformation itself is called "warping" and the parameters of the transformation are known as warping parameters.

The transformation can permit various degrees of freedom. As a rule, rotation, translation, extension or compression, and shearing of the template image are permitted. In this case, six warping parameters must be determined. However, projective or other transformations are also possible. In this case the number of warping parameters may vary. For the application, however, the path of reducing the warping parameters proved useful. Depending on the encounter geometry and target trajectory, certain effects such as shearing or compression do not occur, so that the use of fewer warping parameters (for instance three or five) may be useful.

If the hold point (the sighted point on the target object Z that the high energy laser beam L is supposed to strike) is defined in the template image, the hold point may be transformed into the current image using the determined transformation instructions and the displacement that the control device 36 uses to calculate the correction signal may be determined directly.

The warping parameters are also preferably used for calculating correction signals for actuating a deformable mirror for compensating higher modes (corresponding to a deformation of the radiation spot formed by the high energy laser).

The template image itself may be a generic image of the target object Z that is produced in advance and stored in a memory of the image processing device 34. Alternatively, the template image may be an image generated using an image sequence initially recorded by the image acquisition device 3 (prior to initiating the engagement by activating the high energy laser). Finally, the template image may alternatively also be formed using a selection, made by an operator, of an excerpt from the fine tracking image. Which of these alternative methods is employed depends, for instance, on the type of target object. For rapidly moving target objects, the selection must be made automatically; for slow target objects it is reasonable for the operator to decide. The same applies to the selection of the hold point, which may be provided automatically or by the operator.

During the course of the engagement, the view of the object may change profoundly, for instance due to a flight maneuver of the target object, so that the underlying template image is no longer appropriate to the situation. To counter this effect, the template image may be modified using information from the fine tracking image—the template is then designed to be adaptive. The portion of information from the fine tracking image that is used to modify the template may be limited ("learning rate").

Since, in general, the template image contains fewer pixels than the image acquired by the image acquisition device, and since the calculation complexity and thus also the required computing time increases with the number of pixels, the template is preferably "warped," that is, subjected to a transformation. Since the warping must occur during the course of optimization in every iteration step, this significantly reduces the calculation complexity. In principle, however, the reverse is also possible. In addition, complexity can be spared in that the pixel resolution of the template image is reduced.

Under the aspect of correcting the influence of turbulence, a spatially limited area (characterized by the Fried radius $r_0$) around the hold point on the target object is critical. If the target object is large compared to this area, it may be reasonable to use a so-called sub-template that contains only this area of the target object. In this case, the template image is used for determining a rough orientation (primarily for correcting the movement of the target). Then another detailed orientation is determined using the sub-template (primarily for correcting the movement due to turbulences). Like the selection of the template, the selection of the sub-template may also be made in different ways. Automatic selection of an area around the pre-specified hold point, the size of which is selected as a function of $r_0$, seems particularly reasonable.

The described device produces photographic images of the target object that, using the warping method, are the basis for determining a hold point. Simultaneously, a high energy laser spot is radiated onto the target in the same optical canal or on the same optical path through which the light for the photographic images is received.

Figure 2:
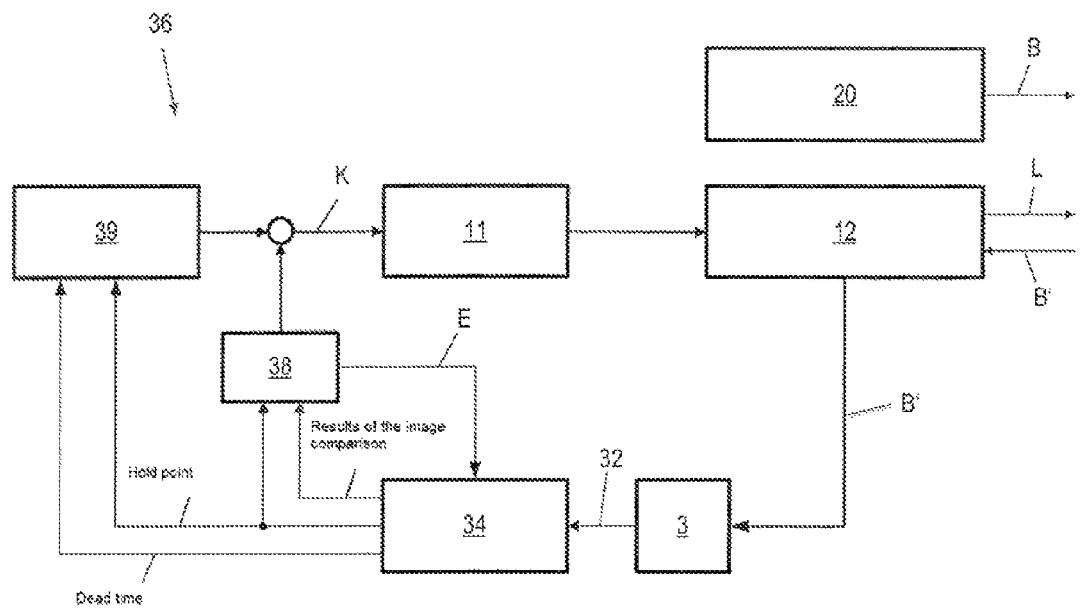

The signal processing in a control circuit formed with the control device 36 in the device is depicted as a block diagram in FIG. 2. The control device is downstream of the image processing device 34 has a filter device 38 and a fine tracking controller 39 as controller device. As may be seen from FIG. 2, the filter device 38 and the fine tracking controller are switched in parallel, not in series.

Both the filter device 38 and the fine tracking controller 39 obtain signals from the image processing device 34 via corresponding signal lines. A filter result signal E is conducted from the filter device 38 back to the image processing device 34. The output signals of the filter device 38 and of the fine tracking controller 39 are conducted to the control device 11 of the second tilted mirror 12 as correction signals K.

The manner in which the controller device 36 works is described in the following.

Once the image has been acquired using the image acquisition device 3, the hold point H in the current fine tracking image is determined in the image processing device 34 using a suitable image processing method. Iterative methods in particular that calculate an affine transformation using template images appear suitable for this (for instance the warping methods described in the foregoing).

The results of the image processing, specifically the hold point position in the current fine tracking image and other parameters of an affine transformation, for instance, and, if warping methods are used, the warping parameters, form the input variables for both the filter device 38 and the fine tracking controller 39. Using a filter provided in the filter device, the image information is combined with the movement information J supplied to the filter device 38. During this combination, information for instance about the target object that is obtained using measurements by a radar observing the target object or that is obtained as results of rough tracking image processing (not shown) flow in as movement information J. In addition, depending on the target object type and on the maneuver that the target object is performing, different filters may be used and calculated in parallel, and the best filter for the current situation may be selected using a suitable strategy.

The filter results are used to pre-control the piezo-mirror corresponding to the estimated target movement in order to minimize contouring errors in this manner. In the (theoretically) ideal case, when the filter model exactly matches to the movement of the high energy spot on the target, the disturbances are thus compensated completely, without the control algorithm becoming active.

In practice, however, deviations occur due to modelling errors and unmodeled dynamics. Suppressing these deviations is the task of the fine tracking controller 39. Since the filter device 38 in the structure illustrated in FIG. 2 is used in parallel to the fine tracking controller 39, the control algorithm may continue to react to higher frequency portions.

In addition to the current hold point position in the image, the control algorithm also obtains the information about the dead time caused by the image processing method, such as for instance image integration, so that the control algorithm may be adapted appropriately.

The filter results are also used to support the calculation of the image processing in that the image processing is initiated in a suitable manner. This is especially advantageous for iterative methods (for instance, for warping methods). This increases the robustness relative to a target loss and minimizes the number of necessary iterations for the image processing method.

Reference numbers in the claims, description, and drawings are merely intended to facilitate better understanding of the invention and shall not limit the protective scope.

REFERENCE LIST

1 High energy laser
2 Illumination device
3 Image acquisition device
10 First tilted mirror (radiation decoupling device)
11 Control device
12 Second tilted mirror (optical correction device)
14 Focusing device
20 Illumination laser
30 High speed camera
32 Signal line
34 Image processing device
36 Controller device
38 Filter device
39 Fine tracking controller
A Atmosphere
B Illumination beam
B' Reflected illumination beam
E Filter results
H Hold point
J Movement information
K Correction signal
L High energy laser beam
P Optical path
S Radiation spot
T Turbulences
V Device
Z Target object

What is claimed is:

1. A method for local stabilization of a radiation spot on a remote target object, wherein the radiation spot is formed by a high energy laser beam that is aimed at the target object by a high energy radiation emitter, the method comprising:
illuminating the target object by an illumination beam that is aimed at the target object by an illumination device;

receiving, by an image acquisition device, radiation reflected by the target object that is illuminated by the illumination beam, wherein the radiation reflected by the target object to the image acquisition device passes through the same optical path as the high energy laser beam;

performing an image processing by analyzing and comparing an image of the illuminated target object or part of the illuminated target object acquired by the image acquisition device to at least one image of the illuminated target object or part of the illuminated target object produced at a prior point in time or to an image stored in an object database;

determining a correction signal, based on said comparing, with which an optical correction device arranged in the optical path passed through by both the high energy laser beam and the reflected radiation is actuated;

providing a result of said comparing to a filter device and to a fine tracking controller;

producing a filter correction signal by the filter device;

producing a controller correction signal by the fine tracking controller; and forming the correction signal from the filter correction signal and the controller correction signal.

2. The method in accordance with claim 1, wherein producing the filter correction signal in the filter device further comprising calculating a displacement of the radiation spot from a hold point for a next time interval using at the result of the image processing.

3. The method in accordance claim 1, wherein producing the filter correction signal comprises producing a filter correction signal by the filter device in a faster cycle than a cycle of the image processing, thereby reducing contour errors due to dead times.

4. The method in accordance with claim 1, wherein, in addition to the result of said image processing, at least one of measurement values of a radar measurement of the target object and measurement values of a rough tracking image processing are provided to the filter as additional measured values.

5. The method in accordance with claim 1, wherein the fine tracking regulator is called up in a cycle of the image processing, and wherein the filter device is called up with a cycle that is greater than the cycle of the image processing.

6. A device configured to locally stabilize a radiation spot on a distant target object according to the method of claim 1, wherein the device comprises:

an illumination device for emitting the illumination beam onto the target object;

a high energy laser for emitting the high energy laser beam onto the target object;

an optical correction device that is arranged in the optical path of the high energy laser beam and is configured to be actuated by a control device;

a radiation decoupling device arranged in the optical path of the high energy laser beam and that is configured to decouple radiation from this optical path that is received as a reflection of the illumination beam and to guide said radiation onto the image acquisition device; and an image processing device, connected to the image acquisition device and comprising the control device, configured to transmit an image signal therefrom, wherein the control device is configured to produce the correction signal and to transmit the correction signal to the optical correction device, wherein control device comprises the filter device and the fine tracking controller arranged parallel thereto.

7. The method in accordance with claim 2, wherein the filter model of the movement of the radiation spot has portions based on a movement of the target object and based on turbulence.

8. The method in accordance claim 2, wherein producing the filter correction signal comprises producing a filter correction signal by the filter device in a faster cycle than a cycle of the image processing, thereby reducing contour errors due to dead times.

9. The method in accordance with claim 7, wherein the correction signal is determined by summing the filter correction signal and a regulator correction signal.

10. The method in accordance with claim 9, wherein the regulator correction signal is calculated in the fine tracking regulator based on the result of the image processing.

11. The method in accordance with claim 10, wherein the regulator algorithm is adapted to the current dead time using a time stamp.

12. The method in accordance with claim 1, wherein the correction signal is determined by summing the filter correction signal and a regulator correction signal.

13. The method in accordance with claim 12, wherein the regulator correction signal is calculated in the fine tracking regulator based on the result of the image processing.

14. The method in accordance with claim 13, wherein the regulator algorithm is adapted to the current dead time using a time stamp.

* * * * *